United States Patent [19]

DeArdo, Jr. et al.

[11] Patent Number: 4,813,580
[45] Date of Patent: Mar. 21, 1989

[54] METHOD OF POURING STEEL

[76] Inventors: Anthony J. DeArdo, Jr., 205 Mayfair Dr., Pittsburgh, Pa. 15228; Calixto I. Garcia, 122 Fenwick Dr., Pittsburgh, Pa. 15235; George A. Ratz, 343 Old Gilkeson Rd., Pittsburgh, Pa. 15228

[21] Appl. No.: 97,694

[22] Filed: Sep. 17, 1987

[51] Int. Cl.⁴ .............................................. B22D 41/00
[52] U.S. Cl. .................................. 222/590; 222/591; 222/593; 219/300; 219/301; 219/427; 266/236
[58] Field of Search ............... 222/590, 591, 593, 606, 222/607; 337/117, 132, 135; 219/300, 301, 427; 266/236

[56] References Cited

U.S. PATENT DOCUMENTS

| | | | |
|---|---|---|---|
| 3,974,108 | 8/1976 | Staut et al. | 252/518 X |
| 4,041,236 | 8/1977 | Dumont et al. | 373/117 |
| 4,359,625 | 11/1982 | Okada et al. | 222/593 X |

FOREIGN PATENT DOCUMENTS

| | | | |
|---|---|---|---|
| 62671 | 5/1981 | Japan | 222/593 |
| 1076878 | 9/1986 | Japan | 222/593 |
| 975190 | 11/1982 | U.S.S.R. | 222/593 |

*Primary Examiner*—Joseph J. Rolla
*Assistant Examiner*—David H. Bollinger
*Attorney, Agent, or Firm*—Martin J. Carroll

[57] ABSTRACT

Build-up on the surface of a refractory body receiving molten metal is eliminated or reduced by making at least a portion of a material that can be electrically heated to at least about 1150° C., such as an alkaline-earth doped lanthanum chromite. When the surface is that of a nozzle or shroud, an electric current is supplied to heat the material around the opening in the nozzle or shroud to at least about 1150° C.

3 Claims, 1 Drawing Sheet

METHOD OF POURING STEEL

This invention relates to a method of reducing build-up on a refractory surface and more particularly for reducing build-up on the opening of a nozzle or the like through which molten steel is being poured. The invention may also be used to increase the life of the lining of a container for molten metal particularly steel. The main reason for such build-up is the loss of heat from the steel to the surrounding refractory and also to its surrounding atmosphere. Build-up reduces the life of the refractory.

During contemporary steelmaking, the loss of heat to the relatively cold refractory is reduced by having appropriate regions of the ladles and tundishes preheated in a separate operation prior to their use in steelmaking. Unfortunately, the temperature of the preheated refractory is often not high enough to minimize the temperature losses and chilling of the liquid metal that occurs. Excessive chilling can lead to the formation of skulls of solidified metal in the bottoms of ladles or tundishes and can cause freezing of stopper rods or sliding gates. The reduced liquid metal temperature also causes blockages in ladle-to-tundish or tundish-to-mold shrouds and nozzles because of particle build-ups in the shroud or nozzle openings. Moreover, ladle shrouds are often not preheated because the tubes are manually placed in position just prior to ladle opening and pouring operations.

One of the most frequently occuring and troublesome problems encountered during continuous casting is shroud or nozzle blocking due to particle buildups in the nozzle openings. This is particularly severe when casting small sections of aluminum-killed steels, titanium-bearing steels, boron-treated steels, and lanthanide (rare earth metal)-treated steels. The major reason for this clogging is that relatively cold surfaces offer excellent sites for precipitation of particles from the liquid steel. Hence, particles present in the liquid steel can precipitate on the relatively cold inner surface of the shroud/nozzle, and eventually lead to clogging. The chief sources of these particles, in the case of oxide build-up, are products of reaction between the liquid steel and the nozzle refractory; reoxidation products such as $Al_2O_3$, indigenous deoxidation products, and oxide particles which form from a supersaturated melt due to a drop in liquid steel temperature at the liquid/nozzle interface. Tests have shown that the tendency towards clogging increases at lower temperatures. Thus, it is common to preheat the nozzles prior to pouring, but the temperatures obtained are usually not high enough to prevent precipitation of the oxides on the opening. Likewise the molten steel passing through the opening does not heat the refractory sufficient to prevent oxide precipitation.

Various proposals have been advanced and/or used. These include argon bubbling (gas purging); G. J. Mackie, "Recent Advances in Steel Pouring Refractories", Proceedings IV International Iron & Steel Congress, The Metals Society, London, May 1982: self-eroding nozzles, Okamoto, "Development of Alumina-Graphite Immersion Nozzles for CC", Iron and Steel Engineer, Dec. 1982, p. 47: nozzle design, Singh, "A Practical Solution to the Problem of Alumina Building in Nozzles During CC of Aluminum-containing Steels", Steelmaking Proceedings, Vol. 62, 1979, pp. 3–10: and modification of inclusion chemistry and forming lower melting-point deoxidation products, Hilty "Modifications of Inclusions of Calcium", Iron and Steelmaker, 1975, Part 1 (May) pp. 17–22 and Part II (June), pp. 20–27. However none of the proposals that we know of has been completely effective.

Our invention lies in providing an electrically-conducting refractory and passing current therethrough to heat the refractories to elevated temperatures both before and during pouring.

It is therefore an object of our invention to provide a method of greatly reducing build-up on the surface of a refractory member.

Another object is to provide such a method which eliminates or delays shroud or nozzle blocking.

A further object is to provide such a method which increases the life of the refractory member.

These and other objects will be more apparent after referring to the following specification and attached drawings in which FIG. 1 is a sectional view of a nozzle embodying the preferred species of our invention;

Figure 1:
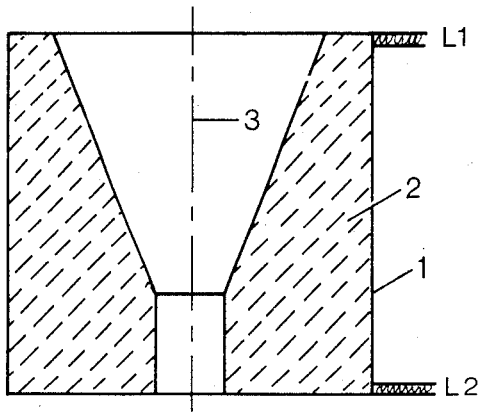

Referring more particularly to Figure I, reference numeral 1 indicates a nozzle having a body 2 made of an electrically conducting-refractory material that can be electrically heated to at least about 1150° C. An axial opening 3 through the body receives the molten steel and may be of any conventional formation. Electricity is provided to body 2 by lines L1–L2.

The refractory body is preferably made of a lanthanum chromite. These chromites have melting points between 2300° and 2500° C. and have good corrosion and oxidation resistance, low volatility, good thermal shock resistance, and good thermomechanical and physical properties. They are generally prepared with a slight excess of chromium, about 1.02 to 1.05 mole of chromium oxide per mole of lanthanium oxide. Calcium, magnesium or strontium-doping can range from zero to about 30 percent, as shown by Staut et al., U.S. Pat. No. 3,974,108 dated Aug. 10, 1976 for a calcium-magnesium-and strontium-doped lanthanum chromite having formulas $(La_{1-x}Sr_x)CrO_3$, $(La_{1-x}Ca_x)CrO_3$, $(La_{1-x}Mg_x)CrO_3$, or $(La_1Mg_xCr_{1-x}O_2)$ where $0 \leq X \leq 0.30$. A strong aqueous solution of chromic acid is formed and with vigorous stirring, lanthanum oxide and calcium magnesium or strontium carbonate, hydroxides or oxides are dissolved and reacted therewith. The solution is evaporated and dried to provide a solid cake which is calcined at a temperature from about 1000° to 1600° C. and preferably at about 1200° to 1500° C. According to our invention the calcined material is ground so that it will substantially all pass through a 100 mesh screen and for best results through a 200 mesh screen. The nozzle 1 is formed in a conventional manner from the powder such as by extruding with an appropriate binder, by pressing or isostatic pressing. The nozzle is then fired in an appropriate atmosphere to a temperature of about 1500° to 2300° C., preferably 1700° to 2100° C. This results in a body having a density of less than 90% theoretical.

Before liquid metal pouring, current is provided through lines L1–L2 to bring the temperature up to about 1150° C. and current continues to be applied during pouring to maintain the temperature to at least about 1150° C. As a result of this practice, the build-up on the nozzle opening is at least substantially reduced, thus resulting in greatly increased long term liquid metal flow and longer nozzle life.

Figure 2:
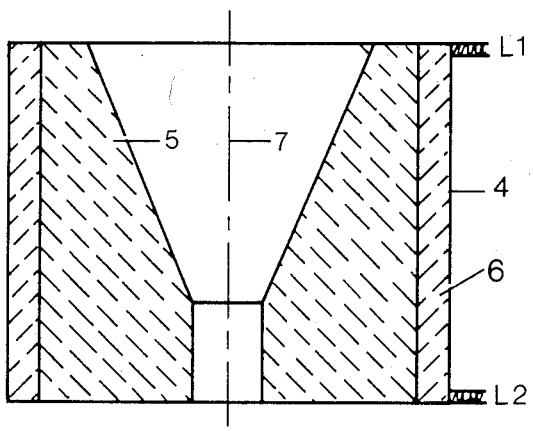
FIG. 2 is a sectional view of a nozzle embodying a second embodiment of our invention.

FIG. 2 shows a second embodiment of our invention in which nozzle 4 has an inner portion 5 made of conventional refractory material such as zirconia or alumina and an outer portion 6 made of the same material as nozzle 1. The outer portion 6 is heated as body 1 of the first embodiment to raise the temperature surrounding the axial opening 7 to at least about 1150° C.

Figure 3:
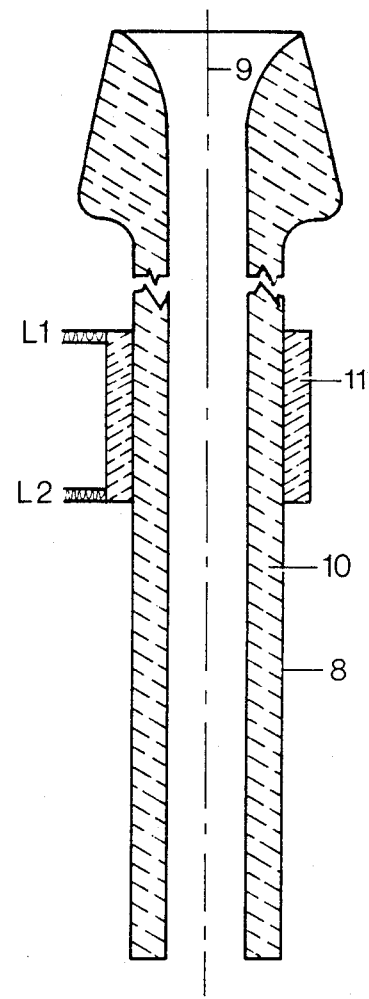
FIG. 3 is a sectional view of a shroud embodying our invention.

FIG. 3 shows a third embodiment of our invention in which shroud 8 of any conventional formation having an axial opening 9 therethrough has an inner body portion 10 made of conventional refractory material and an outer body portion 11 made of the same material as nozzle 1. Portion 11 is heated as body 1 of the first embodiment by lines L1 and L2 to raise the temperature of refractory material 10 to at least 1150° C. before and during flow of liquid metal through axial opening 9.

Figure 4:
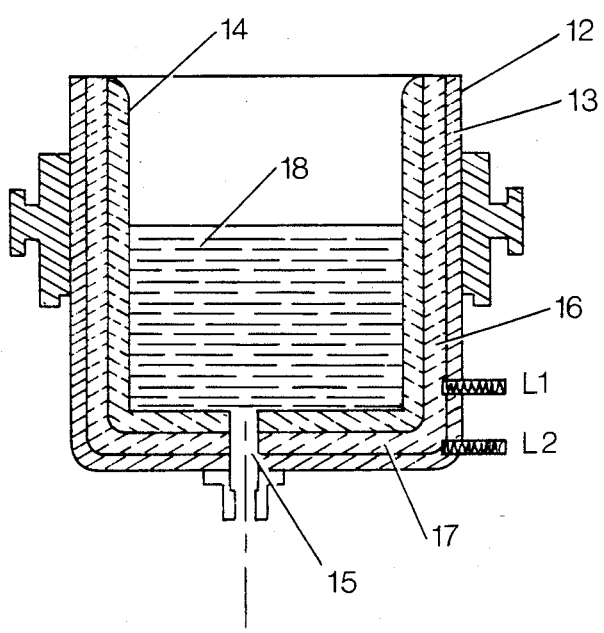
FIG. 4 is a sectional view of a ladle embodying our invention.

FIG. 4 shows a ladle 12 having a steel shell 13 and a conventional inner lining 14 made of the usual refractory. An opening 15 is provided at the bottom of the ladle and has the usual stopper (not shown). According to our invention we provide a layer 16 between shell 13 and lining 14, at least the bottom portion 17 being made of the same material as nozzle 1. Electric power lines L1-L2 are connected to portion 17. The ladle 12 may be preheated in the usual way or by applying electricity through lines L1-L2. In either case electricity is provided during the time molten steel 18 is in the ladle to maintain the temperature of lining 14 to at least about 1150° C., thus decreasing formation of skulls.

While several embodiments have been shown and described it will be understood that other adaptations and modifications may be made within the scope of the following claims.

We claim:

1. The method of reducing build-up on the surface of a refractory body receiving molten metal which comprises providing at least a portion of said body with alkaline-earth doped lanthanum chromite refractory that can be heated electrically to at least about 1150° C., said lanthanum chromite being calcined before being ground to a size that substantially all will pass through a 100 mesh screen, and providing electric current to said lanthanum chromite while molten metal is in contact with said surface to maintain it at least about 1500° C.

2. The method of claim 1 in which said lanthanum chromite has a density less than 90% theoretical.

3. The method of claim 2 in which said refractory surface is the surface of the opening of a nozzle.

* * * * *